United States Patent
Weinert

[19]

[11] Patent Number: 6,163,309

[45] Date of Patent: Dec. 19, 2000

[54] HEAD UP DISPLAY AND VISION SYSTEM

[76] Inventor: Charles L. Weinert, 201 Appaloosa Dr., Willow Park, Tex. 76087

[21] Appl. No.: 09/232,125

[22] Filed: Jan. 15, 1999

Related U.S. Application Data

[60] Provisional application No. 60/071,695, Jan. 16, 1998.

[51] Int. Cl.[7] ................................................ G09G 5/00
[52] U.S. Cl. ..................... 345/7; 250/253; 250/336.1; 250/339.06; 250/339.11
[58] Field of Search ........................... 345/7; 250/253, 250/336.1–339.6, 339.11, 341.1

[56] References Cited

U.S. PATENT DOCUMENTS

| | | | |
|---|---|---|---|
| Re. 35,148 | 1/1996 | Lizzi et al. | 348/163 |
| 3,261,014 | 7/1966 | Diaz | 343/6 |
| 3,558,209 | 1/1971 | Trufanoff et al. | 350/9 |
| 3,604,803 | 9/1971 | Kaha | 356/340 |
| 5,077,609 | 12/1991 | Manelphe | 358/109 |
| 5,148,412 | 9/1992 | Suggs | 367/131 |
| 5,267,329 | 11/1993 | Ulick et al. | 382/48 |
| 5,534,694 | 7/1996 | Ball et al. | 250/330 |
| 5,534,993 | 7/1996 | Ball et al. | 356/5.09 |

*Primary Examiner*—Richard A. Hjerpe
*Assistant Examiner*—Henry N. Tran

[57] ABSTRACT

A vehicle imaging system for producing an integrated video image of a scene about a vehicle. The system includes sensors for detecting radiation in the range of wavelengths of 250 nm to 12 $\mu$m. The radiation sensors transmit signals to a video mixer to produce an image of the scene in a display assembly. The display assembly may also incorporate information from a RADAR receiver as well as navigational data.

8 Claims, 1 Drawing Sheet

HEAD UP DISPLAY AND VISION SYSTEM

RELATED APPLICATIONS

This application claims the benefit of U.S. Provisional Patent Application Ser. No. 60/071,695, filed Jan. 16, 1998, entitled "Head Up Display and Vision System."

BACKGROUND OF THE INVENTION

1. Field of the Invention

The present invention relates to head up display systems, more particularly to a head up display and vision system which displays a real time, high resolution integrated computer and video image.

2. Prior Art

An operator of a vehicle such as an aircraft, ship, train, truck or the like conventionally must view the scene in front of the vehicle based on the visible light available, either natural or artificial, to determine whether it is safe to advance the vehicle. The operator's vision can be obscured by clouds, fog, smoke or various forms of precipitation such as rain, sleet and snow as well as man-made obstructions. These conditions distort the operator's view of the landing strip for an aircraft, the harbor for a ship, train tracks for an engine or roadways for trucks or other wheeled vehicles. The operator's viewing difficulties are compounded at night when natural visible light is absent and the operator must rely upon artificial light such as runway lights to determine whether the vehicle is moving in the correct direction and at the proper speed and/or altitude. Such artificial lights are particularly subject to distortion or obstruction by inclement weather.

Attempts have been made to improve the information provided to the operator of a vehicle by use of a transportation guidance system. For example, certain aircraft have been equipped with a flight guidance system known as a head up display (HUD). A HUD projects a synthetic representation of the runway or other scene on an optical combiner positioned directly in front of the pilot's head. The pilot's head need not be moved to look down at the cockpit dials. The runway or other scene is projected on the HUD along with other information on the aircraft's speed and position, thus the pilot need not actually directly see the runway. An aircraft HUD may incorporate various flight location and performance information including altitude, glide slope angle, speed and the like to provide the pilot with an image of the runway as it appears from the approaching aircraft. This type of aircraft guidance system merely incorporates navigational data into an image of the runway but does not produce an image of the runway scene.

A HUD imaging system disclosed in U.S. Pat. No. 5,534,694 represents an attempt to provide an actual image of the scene in front of an aircraft. The system uses an infrared imaging sensor which detects radiation emanating from objects in a runway scene outside the range of visible light. Each object in the scene has a characteristic spectral signature which may be detected by a radiation sensor. In that system, the infrared sensor detects wavelengths of infrared radiation having wavelengths of 1 to 5 $\mu$m. A wavelength attenuator selects one set of wavelengths of 1 to 3 $\mu$m containing radiation from runway lights and another set of wavelengths of 3 to 5 $\mu$m containing radiation from objects in the runway scene. A signal processor combines the two sets of wavelengths and produces an image based on the infrared radiation detected. The infrared image is superimposed upon the operator's direct visual view of the runway scene. The optical system used in this system detects radiation in the 1 to 5 $\mu$m range and thus is limited in its ability to detect other types of radiation emanating from various structures present on the runway scene.

A need remains for an imaging system which detects and incorporates radiation emanating from a scene in the ultraviolet through infrared radiation wavelengths of the electromagnetic spectrum that is selected by the operator for existing operating conditions and immediate mission objectives.

SUMMARY OF THE INVENTION

This need is met by the present invention which includes an imaging system for producing an integrated video image of a scene. The system includes a sensor assembly adapted to detect radiation emitted from the scene at wavelengths between about 250 nanometers (nm) and 12 microns ($\mu$m), a video mixer which receives signals from the sensor assembly and a display assembly which receives signals from the video mixer and produces an image of the scene. The sensor assembly includes an infrared radiation sensor, an ultraviolet radiation sensor and a visible light sensor. The image produced by the display assembly incorporates radiation in wavelengths in the ultraviolet through infrared range of the electromagnetic spectrum. The system may further include a radar emitter and detector. The display assembly is adapted to receive radar signals from the radar detector and incorporate the radar signals into the image produced by the display assembly. Navigational data may be received by a navigational data receiver and transmitted to the display assembly for incorporation into the image produced therein. The display assembly is adapted to be mounted within a vehicle for displaying an image of a scene outside the vehicle.

The invention further includes a method of imaging a scene having the steps of receiving radiation from the scene with a sensor assembly, the sensor assembly being adapted to detect radiation from the scene at wavelengths between about 250 nm and 12 $\mu$m, converting the radiation received by the sensor assembly to a radiation video image and displaying the radiation video image on a display assembly. The method may further include the steps of receiving a radar signal from a radar transmitter at the scene, converting the radar signal to a radar video image and incorporating the radar video image into the radiation video image and/or the steps of receiving a navigational data signal from a navigational data transmitter, converting the navigational data signal to a navigational data video image and incorporating the navigational data video image into the radiation video image. Path guidance is provided as separate symbology overlaying this video image or as an integrated part of the video image.

A complete understanding of the invention will be obtained from the following description when taken in connection with the accompanying drawing figure wherein like reference characters identify like parts throughout.

DESCRIPTION OF THE PREFERRED EMBODIMENT

Figure 1:
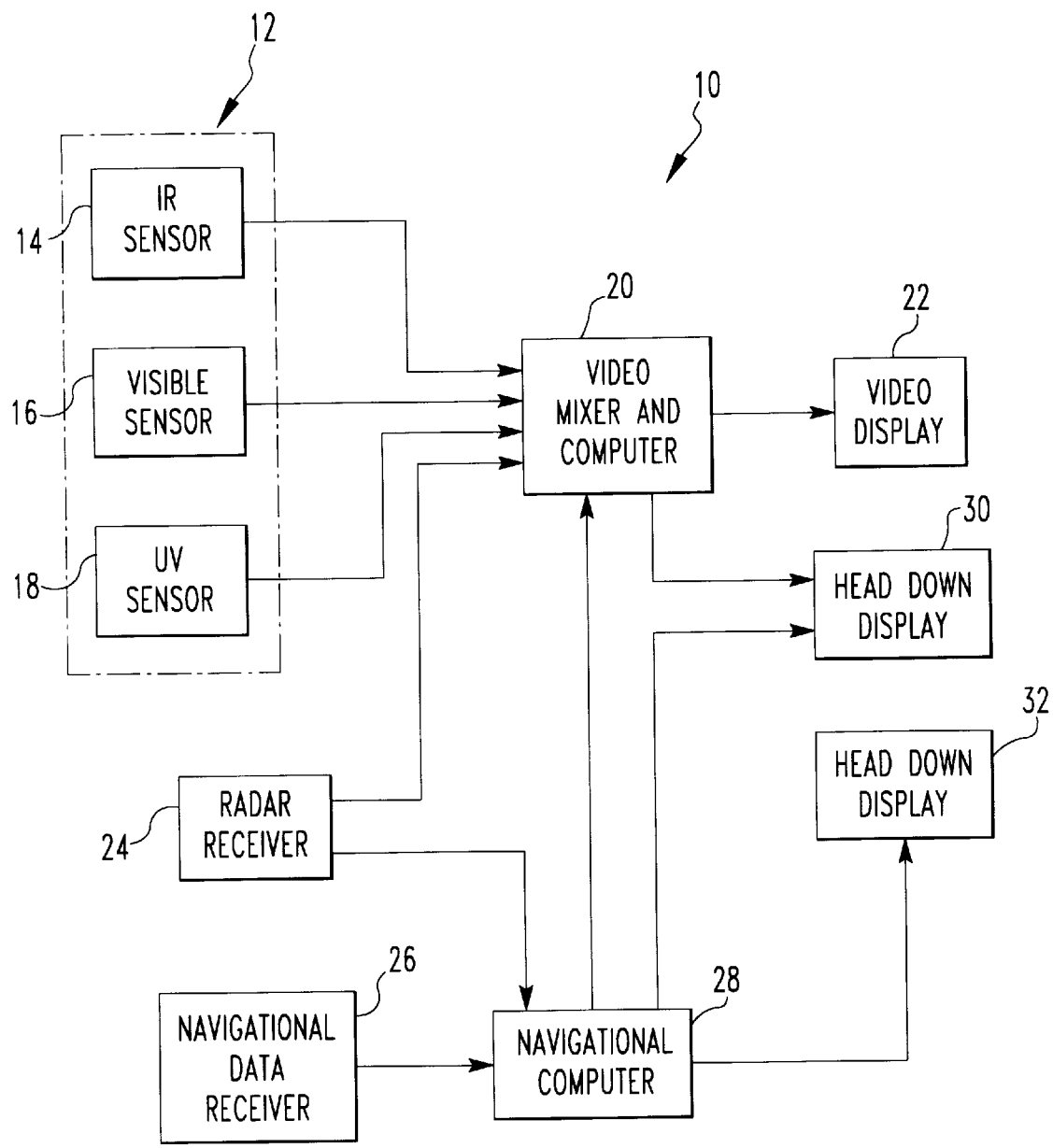
FIG. 1 is a schematic of the head up display and vision system made in accordance with the present invention.

The present invention includes a head up display and vision system for use in aircraft ships, weapons systems, ground and subsurface vehicles. In the system 10 depicted in FIG. 1, radiation from a scene approached by a vehicle is detected by a sensor assembly 12 having an infrared and near infrared radiation sensor 14, a visible light sensor 16 and an ultraviolet sensor 18. By incorporating each of the infrared and near infrared radiation sensor 14, visible light sensor 16 and ultraviolet light sensor 18, the sensor assembly 12 may detect radiation emanating from a scene in the range of about 250 nm to 12 μm. This range covers about one quarter of the electromagnetic spectrum. A suitable infrared and near infrared sensor 14 is able to detect radiation in the 700 nm to 12 Am wavelength range such as the IR-M700 sensor available from Mitsubishi Electronics America of Cypress, California. The visible light sensor 16 should detect wavelengths of about 400 nm to 700 nm and may be the Hamamatsu 4742-95 Special UV Camera Version. A suitable ultraviolet sensor 18 is able to detect radiation in the about 250 nm to 400 nm wavelength range such as the FogEye sensor available from Norris ElectroOptics, Inc., Ellicott, Md. The sensors 14, 16 and 18 each convert the respective radiation to an electrical signal which is transmitted to a video mixer 20. The video mixer allows multiple, for example four images, to be present on a single video display screen. The images are fused together and may be viewed together or as separate images. A suitable video mixer is available from Avalex of Atlanta, Georgia. The video mixer produces an image of the scene based on the complete spectrum of radiation detected by the sensors 14, 16 and 18. Filters are selected by the crew, using controls associated with the video mixer, to select the appropriate combinations of wavelengths based on existing ambient conditions and sensor performances in those specific ambient conditions. This allows an optimal choice whether the conditions are blowing sand, snow, light rain, heavy rain, fog, large droplets, small droplets, or other obstructions of the operator's view.

The video mixer 20 includes a computer having a data management system capable of converting the radiation signals to optical signals to produce an image of the scene based on the radiation from the ranges of wavelengths of the electromagnetic spectrum detected by the sensors. Each of the objects in the scene such as vegetation, bodies of water, concrete, and building structures as well as visible lights such as runway lights, have a spectral signature with wavelengths ranging from ultraviolet to infrared. The video mixer 20 interprets the spectral signature detected by the sensors 14, 16 and 18 and produces an image of the scene in front of the vehicle. The electrical signal produced by the video mixer 20 is then displayed on a video display 22. The video display 22 preferably includes a cathode ray tube (CRT) which is adapted to be positioned directly in front of the operator's head.

Radar signals from a radar receiver 24 may also be introduced to the video mixer 20 as shown in FIG. 1. By including radar signals in the signal produced by the video mixer, another one eighth of the electromagnetic spectrum is detected by the system. A navigational data receiver 26 may also be included in the system. The navigational data receiver 26 may receive data from a navigational system such as Global Positioning System (GPS) or Global Navigation Satellite System (GLONASS) which is transmitted to a navigational computer 28 to produce a signal receivable by the video mixer 20. Examples of suitable navigational systems (GPS or GLONASS) are also available from North-Star of Burlington, Mass.; Ashtech of Reston, Va.; Novatel of Calgary, Canada; Inertial Navigation Systems available from Honeywell, Inc., Minneapolis, Minn. Thus, the navigational data may be combined with the spectral signature received by the video mixer 20 to enhance the video display 22 with the navigational data and mission significant course guidance information.

The system 10 may further include a first head down display 30 adapted to receive a video signal from the video mixer 20 and the navigational computer 28 to provide a display for the operator and other crew members, allowing other crew members to keep a picture of location and operational intent from the operator's actions and the external cues presented. The system 10 may also include a second head down display 32 which receives data from the navigational computer and presents a view of the vehicle with respect to earth according to sensor systems off board the vehicle including data linked from other vehicles, ground or space based sensor and radar images, and sensor systems on board the vehicle such as independent radar or side looking radar systems. This expands the range and field of view of sensor systems placed on the vehicle, allows cooperative mission events to occur (such as sorting targets and multiple mission goals). The chief operator (captain) can focus on immediate obstacles, mission goals, and system guidance while an assistant (first officer, systems operator, or navigator) provides additional information affecting the next set of mission and path selection priorities. The imagery displayed is precisely matched to the external sensors' geometry. The image may be incorporated into head gear or a helmet mounted display unit such that other operating personnel's view (a field of view) can be correlated to the external vehicle geometry by a head tracker.

The video mixer 20 receives radiation from the sensors 14, 16 and 18 between about 250 nm and 12 μm. The sensors can detect radiation which is unaffected by natural obstacles such as water vapor, rain, snow, sleet, ice pellets, smoke, haze, dust and chemical compounds, other weather conditions and other natural occurring and man-made obstructions to the operator's visible perception of the scene. The emissions detected by the sensors pass through these obstacles and may be filtered and computer processed according to known band pass characteristics for the specific emission sensor observation conditions. Electronic filtering of spectral, relative contrast, and color characteristics allow fine comparisons to be made and many targets and mission objectives recognized. The characteristics of the particular target observed behind the natural or man-made obstacles may be enhanced by a sensor filtering system that selects and emphasizes mission critical information and ignores unusable and unimportant information. Visual, UV, radar, and IR spectral characteristics and target relative motion are used to perform this task. The data management system eliminates sensor signatures irrelevant to an operator's and/or a crew's task objectives.

Although the present invention has been described for assisting operation and control of a vehicle, other uses thereof are contemplated. The system 10 may be used in conjunction with a weapon system to detect the location of a stationary or moving target. In non-vehicular situations, the system 10 may be used to detect certain subterranean structures such as the location in a mining operation of a coal seam or a weakness in the surrounding rock strata and to coordinate multiple activities in such arenas as operating rooms and to perform condition monitoring of other vehicles or nearby surroundings.

I claim:

1. A vehicle imaging system for producing an integrated video image of a scene comprising:

an infrared radiation sensor;

an ultraviolet radiation sensor;
a video mixer, said video mixer being configured to receive signals from said infrared radiation sensor and said ultraviolet radiation sensor; and
a display assembly adapted to receive signals from said video mixer and produce an image of the scene.

2. The system of claim 1 wherein said infrared radiation sensor is configured to detect radiation having wavelengths between about 700 nm and 12 μm.

3. The system of claim 2 wherein said ultraviolet radiation sensor is configured to detect radiation having wavelengths between about 250 nm and 400 nm.

4. The system of claim 1 further comprising a visible light sensor, wherein said video mixer is configured to receive signals from said visible light sensor such that the image produced by said display assembly incorporates radiation in wavelengths between about 250 nm and 12 μm.

5. The system of claim 4 further comprising a RADAR receiver, wherein said video mixer is configured to receive RADAR signals from said RADAR receiver and incorporate the RADAR signals into the image produced by said display assembly.

6. The system of claim 4 further comprising a navigational data receiver and a navigational computer, said navigational computer configured to receive navigational data from said navigational data receiver and transmit the navigational data to said video mixer such that the navigational data is incorporated into the image produced by said display assembly.

7. The system as claimed in claim 4 further comprising a first head down display, said first head down display being configured to receive a video signal from said video mixer and data from said navigational computer to display a digital signal or video image.

8. The system as claimed in claim 4 further comprising a second head down display, said second head down display being configured to receive data from said navigational computer to display an image of the vehicle formed from the navigational data.

* * * * *